(12) United States Patent
Masterson

(10) Patent No.: US 7,143,851 B2
(45) Date of Patent: Dec. 5, 2006

(54) METHOD FOR CONTROLLING A WHEEL DRIVE SYSTEM OF A HYBRID VEHICLE

(75) Inventor: Brandon Masterson, Whitmore Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 324 days.

(21) Appl. No.: 10/711,171

(22) Filed: Aug. 30, 2004

(65) Prior Publication Data

US 2005/0051371 A1    Mar. 10, 2005

Related U.S. Application Data

(60) Provisional application No. 60/501,766, filed on Sep. 10, 2003.

(51) Int. Cl.
*B60K 1/00* (2006.01)
(52) U.S. Cl. .................. 180/65.2; 180/65.3; 180/65.4
(58) Field of Classification Search ............. 180/65.2, 180/65.3, 65.4, 65.6, 65.7; 475/5; 701/22, 701/36

See application file for complete search history.

(56) References Cited

U.S. PATENT DOCUMENTS

| | | | | |
|---|---|---|---|---|
| 4,335,429 A | * | 6/1982 | Kawakatsu | 701/102 |
| 5,865,263 A | * | 2/1999 | Yamaguchi et al. | 180/65.2 |
| 5,909,094 A | * | 6/1999 | Yamada et al. | 318/140 |
| 5,984,033 A | * | 11/1999 | Tamagawa et al. | 180/65.2 |
| 6,026,921 A | * | 2/2000 | Aoyama et al. | 180/65.2 |
| 6,054,844 A | * | 4/2000 | Frank | 322/16 |
| 6,067,801 A | * | 5/2000 | Harada et al. | 60/705 |
| 6,110,066 A | * | 8/2000 | Nedungadi et al. | 475/5 |
| 6,116,363 A | * | 9/2000 | Frank | 180/65.2 |
| 6,123,163 A | | 9/2000 | Otsu et al. | |
| 6,203,468 B1 | * | 3/2001 | Nitta et al. | 477/5 |
| 6,209,672 B1 | * | 4/2001 | Severinsky | 180/65.2 |
| 6,233,508 B1 | * | 5/2001 | Deguchi et al. | 701/22 |
| 6,330,498 B1 | * | 12/2001 | Tamagawa et al. | 701/22 |
| 6,453,222 B1 | * | 9/2002 | Lasson et al. | 701/22 |
| 6,470,983 B1 | * | 10/2002 | Amano et al. | 180/65.2 |
| 6,510,370 B1 | | 1/2003 | Suzuki et al. | |
| 6,553,287 B1 | * | 4/2003 | Supina et al. | 701/22 |
| 6,581,705 B1 | * | 6/2003 | Phillips et al. | 180/65.2 |
| 6,684,970 B1 | | 2/2004 | Gotou | |
| 6,722,457 B1 | * | 4/2004 | Yamaguchi et al. | 180/65.2 |
| 7,013,213 B1 | * | 3/2006 | McGee et al. | 701/113 |
| 7,079,942 B1 | * | 7/2006 | McGee et al. | 701/113 |
| 2003/0000750 A1 | | 1/2003 | Selbertz et al. | |
| 2003/0034188 A1 | | 2/2003 | Gotou | |

FOREIGN PATENT DOCUMENTS

| | | |
|---|---|---|
| EP | 0 903 492 A2 | 9/1998 |
| EP | 1 020 640 B1 | 1/2000 |
| EP | 1 039 124 B1 | 1/2000 |

\* cited by examiner

*Primary Examiner*—J. Allen Shriver
(74) *Attorney, Agent, or Firm*—David B. Kelley; Brooks & Kushman

(57) ABSTRACT

A method for operating a hybrid vehicle when starting a power source. The method includes initiating a start sequence that includes driving the power source at a target speed, determining a speed adjustment value based on an amount of vehicle acceleration requested by the driver, adjusting the target speed, and modifying output of the electrical machine to maintain the target speed.

20 Claims, 3 Drawing Sheets

METHOD FOR CONTROLLING A WHEEL DRIVE SYSTEM OF A HYBRID VEHICLE

CROSS-REFERENCE TO RELATED APPLICATIONS

This application claims the benefit of U.S. provisional application Ser. No. 60/501,766 filed Sep. 10, 2003.

BACKGROUND OF THE INVENTION

1. Field of the Invention

The present invention relates generally to the control of a hybrid electric vehicle, and more particularly to a method for controlling a wheel drive system of a hybrid electric vehicle when starting a power source, such as an engine.

2. Background Art

Previously, hybrid electric vehicles used specialized control strategies to start an engine. An example of such a strategy is described in U.S. Pat. No. 6,581,705 assigned to the assignee of the present invention. The method in the aforementioned patent utilizes a complex control strategy that monitors the rotational speeds of an engine and a motor/generator, determines a speed slip error indicative of the "slip" of a disconnect clutch disposed between the engine and the motor/generator, and controls the motive torque provided to the engine by a motor/generator. The engine is considered to be started when the slip speed error and motor/generator torque remain below different calibratable tolerances values for a certain amount of time.

It is desirable to provide a simplified, speed-based control strategy for starting an engine in a hybrid electric vehicle. In addition, it is desirable to provide a control strategy that supports engine startups when the vehicle is not already in motion. Problems associated with the prior art as noted above and other problems are addressed by applicant's invention as summarized below.

SUMMARY OF THE INVENTION

According to one aspect of the present invention, a method for operating a wheel drive system of a hybrid vehicle is provided. The hybrid vehicle includes primary and secondary power sources, a power transfer unit, a electrical machine, and a brake system. The power transfer unit is adapted to drive a vehicle wheel and has a plurality of gear ratios. The electrical machine is coupled to the primary power source and the power transfer unit. The electrical machine is configured to be powered by the primary and/or secondary power sources. The brake system is adapted to inhibit rotation of the vehicle wheel when a brake pedal is actuated.

The method includes initiating a start sequence for the primary power source if the vehicle is stationary and the brake pedal is released. The start sequence includes driving the primary power source with the electrical machine to obtain a target speed. The method also includes the steps of determining a speed adjustment value based on an amount of vehicle acceleration requested by the driver, increasing the target speed by an amount equal to the speed adjustment value, and adjusting the output of the electrical machine to maintain the target speed. The method reduces the delay between a driver's request for acceleration and delivery of the requested torque to the vehicle wheels, thereby providing improved vehicle operating performance.

The determining, adjusting, and modifying steps may be repeated if the power source is not started, a gear ratio is engaged, and the amount of vehicle acceleration requested by the driver is greater than zero.

The primary power source may be an internal combustion engine. The secondary power source may be a battery.

The amount of acceleration requested by the driver may be based on a signal from an accelerator pedal position sensor.

The step of determining whether the brake pedal is actuated may be based on a signal from a brake pedal position sensor.

The primary power source may be fully started when the primary power source is able to maintain the target speed without assistance from the electrical machine. Increasing the target speed may reduce an amount of time between an acceleration request and acceleration of the hybrid vehicle.

According to another aspect of the present invention, a method for controlling a wheel drive system of a hybrid electric vehicle during an engine start that is initiated while the hybrid electric vehicle is stationary is provided. The hybrid electric vehicle includes an engine, a voltage source, a power transfer unit, and a electrical machine. The power transfer unit is adapted to drive a vehicle wheel and has a plurality of gear ratios. The electrical machine is adapted to drive the engine and/or the power transfer unit.

The method includes detecting whether a brake pedal is released, initiating an engine start sequence if the brake pedal is released that includes driving the engine at a target speed, determining whether the engine is started, determining whether a drive gear of the power transfer unit is engaged, determining whether vehicle acceleration is requested, selecting a speed adjustment value, increasing the target speed by an amount equal to the speed adjustment value if vehicle acceleration is requested and a drive gear is engaged and the engine is not started, adjusting output of the electrical machine to maintain the target speed, and repeating the determining, selecting, increasing, and adjusting steps until the engine is started.

The determining, selecting, increasing and adjusting steps may not be repeated if the drive gear is not engaged or if vehicle acceleration is not requested. The drive gear may be engaged when one of the plurality of gear ratios configured to transmit torque from the electrical machine to the vehicle wheel is selected.

The speed adjustment value may be based on an amount of vehicle acceleration demanded by the driver.

According to another aspect of the present invention, a method of starting an engine of a hybrid electric vehicle is provided. The hybrid electric vehicle includes an engine, a voltage source, a power transfer unit, and a starter-alternator. The power transfer unit is adapted to drive a vehicle wheel and has a plurality of gear ratios. The starter-alternator is selectively coupled to the engine via a first clutch and adapted to drive the power transfer unit.

The method includes determining whether the hybrid electric vehicle is stationary, determining whether a brake pedal is released, initiating an engine start sequence if the hybrid electric vehicle is stationary and the brake pedal is released, assessing whether vehicle acceleration is requested by the driver, increasing a target rotational speed if vehicle acceleration is requested by the driver, adjusting a voltage provided to the starter-alternator to maintain the target rotational speed, and repeating the assessing, increasing, and adjusting steps until the engine is started.

The engine start sequence may include powering the starter-alternator with the voltage source to attain the target rotational speed, engaging the first clutch to provide torque to the engine, providing fuel and air to the engine, and combusting fuel in the engine.

The engine may be started when the engine maintains the target rotational speed without torque from the starter-alternator. The target rotational speed may be increased by an amount based on a signal from an accelerator pedal position sensor if vehicle acceleration is requested and a power transfer unit gear ratio is engaged.

DETAILED DESCRIPTION OF THE PREFERRED EMBODIMENT(S)

Figure 1:
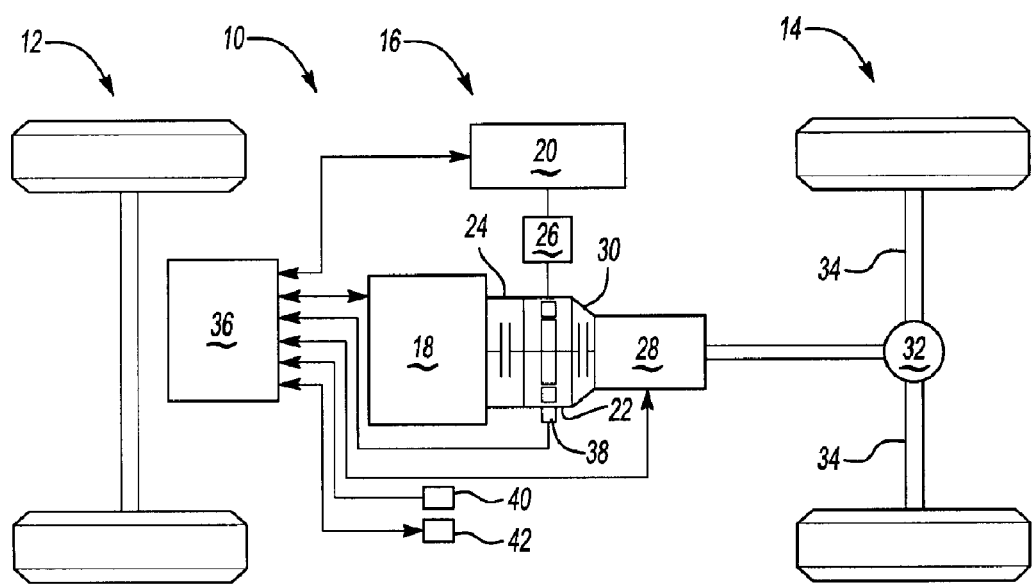
FIG. 1 shows a schematic of a hybrid electric vehicle.

Referring to FIG. 1, a schematic of a hybrid electric vehicle 10 is shown. The hybrid electric vehicle 10 includes a first wheel set 12, a second wheel set 14, and a wheel drive system or drivetrain 16.

The drivetrain 16 may be configured to drive or provide torque to the first and/or second wheel sets 12,14. The drivetrain 16 may have any suitable configuration, such as a parallel drive, series drive, or split hybrid drive as is known by those skilled in the art. In the embodiment shown in FIG. 1, a parallel drive configuration is shown.

The hybrid electric vehicle 10 may also include a plurality of power sources or devices. In the embodiment shown in FIG. 1, the hybrid electric vehicle 10 includes a primary power source 18 and a secondary power source 20. Optionally, additional power sources may be employed.

The primary power source 18 may be any suitable power generating device or system, such as an internal combustion engine adapted to combust any suitable type of fuel like gasoline, diesel fuel, or hydrogen. The primary power source may be configured to provide or receive torque from another component.

The secondary power source 20 may be any suitable voltage source, such as a battery, capacitor, or fuel cell. If a battery is used it may be of any suitable type, such as nickel-metal hydride (Ni—MH), nickel-iron (Ni—Fe), nickel-cadmium (Ni—Cd), lead acid, zinc bromine (Zn—Br), or lithium based. If a capacitor is used it may be of any suitable type, such as an ultra capacitor, super capacitor, electro-chemical capacitor, or electronic double layer capacitor as is known by those skilled in the art.

The primary and secondary power sources 18,20 are adapted to provide power to the drivetrain 16. The primary power source 18 is selectively coupled to an electrical machine 22, such as a motor, motor-generator, or starter-alternator, via a first clutch 24. If the first clutch 24 is engaged, the primary power source 18 may power the electrical machine 22 to propel the hybrid electric vehicle 10 or the electrical machine 22 may provide torque to the primary power source 18. If the first clutch 24 is disengaged, the secondary power source 20 may power the electrical machine 22 to propel the hybrid electric vehicle 10. In addition, both the primary and secondary power sources 18,20 may simultaneously provide power to the electrical machine 22.

An inverter 26 may be disposed between the secondary power source 20 and the electrical machine 22. The inverter 26 converts direct current (DC) to alternating current (AC) when current flows from the secondary power source 20 and converts alternating current (AC) to direct current (DC) when current flows to the secondary power source 20.

The electrical machine 22 may be selectively coupled to a power transfer unit 28 via a second clutch 30. The power transfer unit 28 may be of any suitable type, such as a multi-gear "step ratio" transmission, continuously variable transmission, or an electronic converterless transmission as is known by those skilled in the art.

The power transfer unit 28 is adapted to drive one or more vehicle wheels. In the embodiment shown in FIG. 1, the power transfer unit 28 is connected to a differential 32 by a driveshaft. The differential 32 is connected to each wheel of the second wheel set 14 by a shaft 34, such as an axle or halfshaft.

Optionally, the hybrid electric vehicle 10 may be configured with one or more energy recovery devices, such as a regenerative braking system that captures kinetic energy and returns the recovered energy to the secondary power source 20 via the electrical machine 22.

A vehicle system control module 36 may monitor and control various aspects of the hybrid electric vehicle 10. For example, the control module 36 may be connected to the primary power source 18, secondary power source 20, and power transfer unit 28 to monitor and control their operation and performance. In addition, the control module 36 may receive input signals from various components or sensors. These components may include a motor speed sensor 38 that detects the rotational speed or velocity of the electrical machine 22, an accelerator pedal position sensor 40 that detects the driver's vehicle acceleration commands, and a brake pedal position sensor 42 that detects engagement or release of a brake pedal.

In a hybrid electric vehicle such as that previously described, it is desirable to reduce the delay between a driver's request for acceleration (i.e., additional wheel torque) and delivery of the requested torque to the vehicle wheels. A perceived delay between the time at which the accelerator pedal is pressed and the time at which vehicle acceleration is provided is undesirable and may reduce customer satisfaction.

Figure 2:
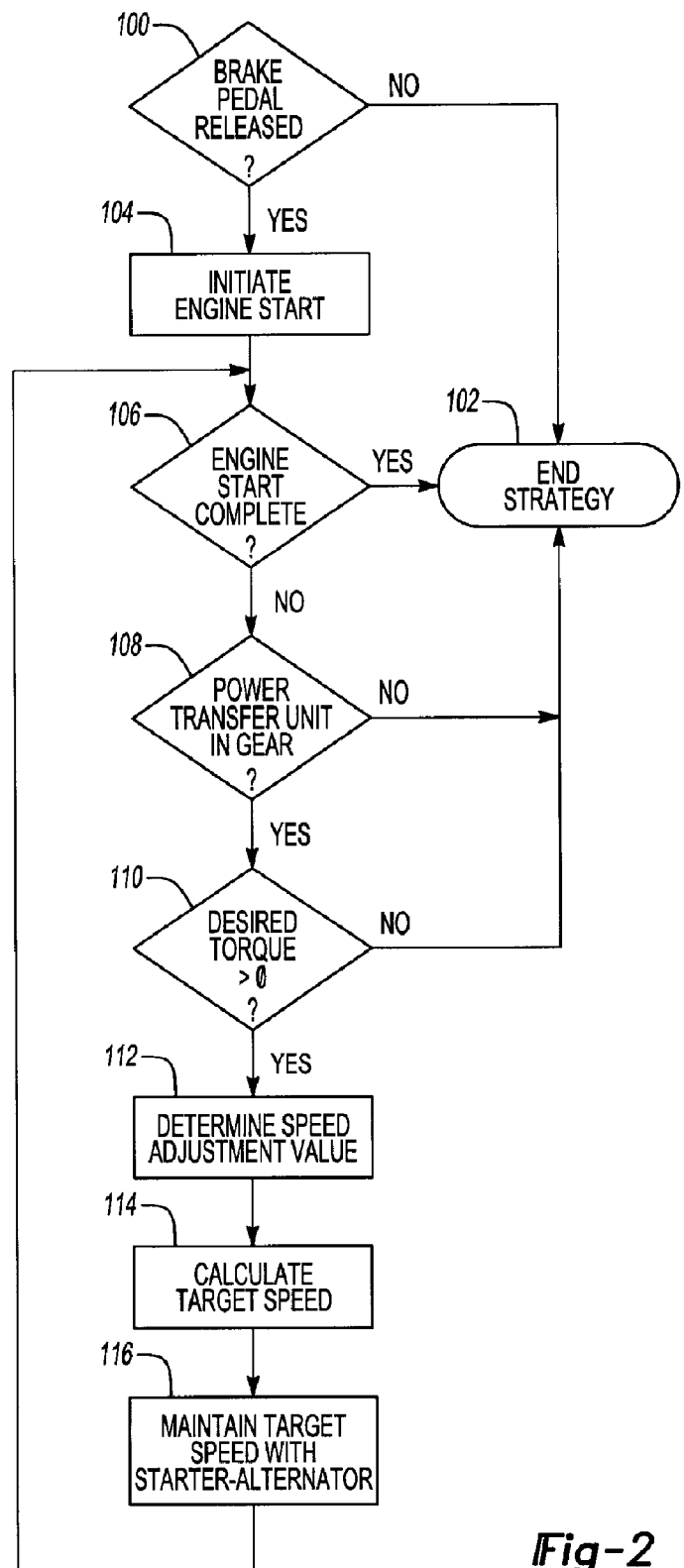
FIG. 2 is a flowchart of a method for starting an engine of a hybrid electric vehicle.

Referring to FIG. 2, a flowchart of a method for detecting and mitigating torque disturbances in the wheel drive system of the hybrid electric vehicle 10 is shown. As will be appreciated by one of ordinary skill in the art, the flowchart represents control logic which may be implemented using hardware, software, or combination of hardware and software. For example, the various functions may be performed using a programmed microprocessor. The control logic may be implemented using any of a number of known programming or processing techniques or strategies and is not limited to the order or sequence illustrated. For instance, interrupt or event-driven processing is employed in real-time control applications, rather than a purely sequential strategy as illustrated. Likewise, pair processing, multitasking, or multi-threaded systems and methods may be used to accomplish the objectives, features, and advantages of the present invention.

This invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

At 100, the method begins with the engine off (i.e., not running) and the vehicle in a stationary position. The status of the engine may be determined from one or more signals received from the engine by the control module. Similarly, vehicle motion may be assessed using a signal from the starter-alternator speed sensor, power transfer unit, or one or more speed sensors disposed in any suitable location between the power transfer unit and vehicle wheels. The method determines whether the brake pedal has been released by the driver. A brake pedal release may indicate that a request for vehicle acceleration will soon follow. If the brake pedal is not released, then the method ends at block 102. If the brake pedal is released, the method continues at block 104.

At 104, the method initiates an engine start in anticipation of a request for vehicle acceleration. The engine start may be accomplished in any suitable manner. In one embodiment, the starter-alternator is accelerated to a target rotational speed, such as 1200 RPM. After the target speed is attained, the first clutch 24 is engaged. Next, the control module enables fuel delivery. In a gasoline-fueled engine, the control module may also control an ignition system to provide a spark in the proper cylinder at the proper time. As the engine begins to operate under its own power, the amount of starter-alternator torque needed to maintain the target rotational speed decreases. As such, the starter-alternator torque may be decreased proportionately with the increase in engine torque.

At 106, the method determines whether the engine start is complete. In one embodiment, the engine is considered to be started when the starter-alternator no longer needs to provide torque to the engine to maintain or exceed the target rotational speed (i.e., zero torque is provided). If the engine is started, then the method ends a block 102. If the engine is not started, then the method continues at block 108.

At 108, the method determines whether the power transfer unit is in gear. This determination may be based on a signal from the power transfer unit to the control module. In the case of a power transfer unit configured as an automatic transmission, the power transfer unit may be considered to be in gear when the driver places a shift lever in "drive" or "reverse". Similarly, the power transfer unit may be out of gear when the driver places the shift lever in park or neutral. If the power transfer unit is not in gear, then additional torque or power from the engine is not necessary and the method ends at block 102. If the power transfer unit is in gear, then the method continues at 110.

At 110, the method determines whether the torque desired by the operator is greater than zero. The torque desired may be detected using the accelerator pedal position sensor. If no torque or vehicle acceleration is desired, then additional power or torque from the engine is not necessary and the method ends at block 102. If additional torque is requested, then the method continues at block 112.

At 112, the method determines a speed adjustment value. The speed adjustment value is indicative of an additional amount of speed or rotational velocity to provide with the starter-alternator to support engine starting and the driver's acceleration commands. Different speed adjustment values associated with different acceleration commands may be stored in a lookup table. These values may be determined or established by vehicle testing.

At 114, the method calculates a new target rotational speed. More particularly, the target rotational speed may be a function of the following equation:

$$TS_2 = TS_1 + \text{ADJUSTMENT}$$

where:

ADJUSTMENT is a speed adjustment value based on an accelerator pedal position signal, $TS_1$ is the previous target rotational speed to be maintained using the starter-alternator, and $TS_2$ is the new target rotational speed to be maintained using the starter-alternator.

At 116, the rotational speed of the starter-alternator is adjusted to the new target rotational speed. This adjustment may be accomplished by modifying the voltage and/or current provided to the starter-alternator. The method then returns to block 106 where the target rotational speed is recalculated based on current operating parameters. Steps 112–116 are repeated until the engine is started or the power transfer unit is not in gear or no acceleration is requested by the driver.

Figure 3:
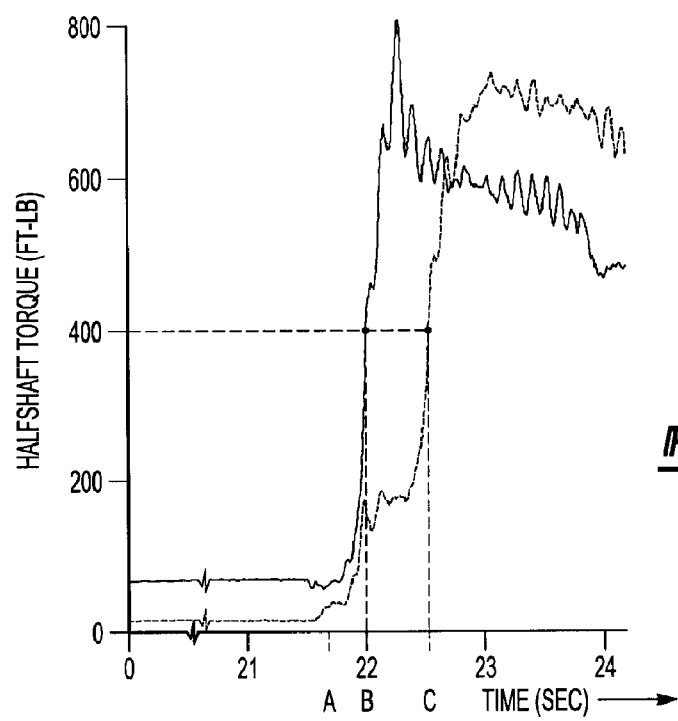
FIG. 3 is a plot depicting halfshaft torque when the method of FIG. 2 is not employed.

Referring to FIG. 3, a graphical representation of vehicle acceleration responsiveness is shown. The vertical axis is halfshaft torque and the horizontal axis is time. A solid line and a dotted line depict two scenarios. The solid line represents the halfshaft torque when the engine is already running. The dotted line represents the halfshaft torque when the engine needs to be started and the method of the present invention is not employed. Point A is the time when additional torque is requested by the driver. Point B is the point at which a halfshaft torque of 400 ft-lb is achieved when the engine is already running. Point C is the point at which a halfshaft torque of 400 ft-lb is achieved when the engine needs to be started. The distance between points A and B is less than the distance between points A and C by approximately 0.5 seconds. More specifically, in the absence of the method of the present invention, vehicle acceleration is provided more quickly when the engine is already started.

Figure 4:
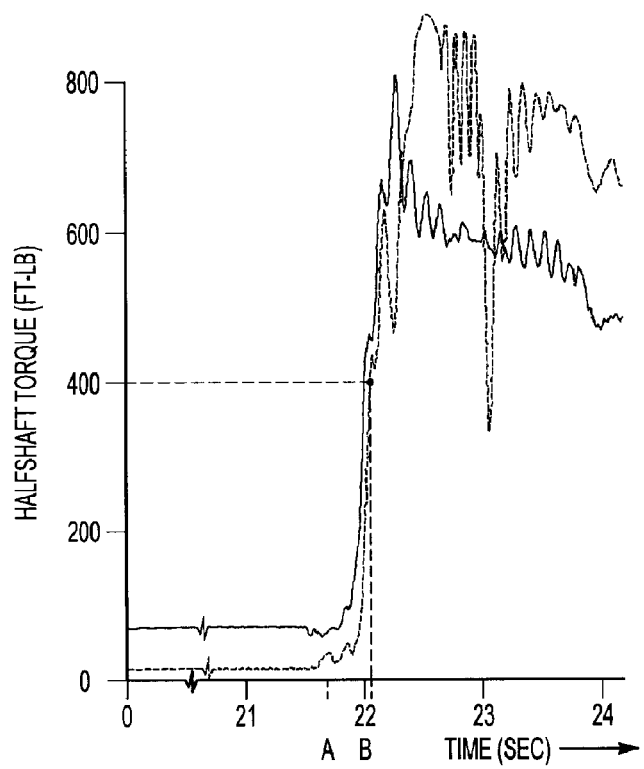
FIG. 4 is a plot depicting halfshaft torque when the method of FIG. 2 is employed.

Referring to FIG. 4, the halfshaft torque in accordance with the present invention is shown. The solid line represents halfshaft torque when the engine is already running and is identical to the solid line in FIG. 3. The dotted line represents the halfshaft torque when the engine needs to be started and present invention is employed. Point A is again the time at which additional torque is requested by the driver and the engine start sequence is commenced. At point B, the halfshaft torque reaches 400 ft-lb if the engine is running (solid line) or if the engine is started in accordance with the present invention (dotted line). As a result, no delay in torque responsiveness is perceived by the driver despite the need to start the engine.

While the best mode for carrying out the invention has been described in detail, those familiar with the art to which this invention relates will recognize various alternative designs and embodiments for practicing the invention as defined by the following claims.

What is claimed is:

1. A method for operating a wheel drive system of a hybrid vehicle, the hybrid vehicle having primary and secondary power sources, a power transfer unit adapted to drive a vehicle wheel and having a plurality of gear ratios, an electrical machine coupled to the primary power source and the power transfer unit and configured to be powered by the primary and/or secondary power sources, and a brake system adapted to inhibit rotation of the vehicle wheel when a brake pedal is actuated, the method comprising:

initiating a start sequence for the primary power source if the vehicle is stationary and the brake pedal is released, the start sequence including driving the primary power source with the electrical machine to attain a target speed;

determining a speed adjustment value based on an amount of vehicle acceleration requested by a driver if a gear ratio of the power transfer unit is selected and the primary power source is not started;

adjusting the target speed based on the speed adjustment value; and modifying output of the electrical machine to maintain the target speed.

2. The method of claim 1 further comprising repeating the determining, adjusting, and modifying steps if the primary power source is not started, a gear ratio is engaged, and the amount of vehicle acceleration requested by the driver is greater than zero.

3. The method of claim 1 wherein the primary power source is started when the primary power source is able to maintain the target speed without assistance from the electrical machine.

4. The method of claim 1 wherein the amount of acceleration requested by the driver is based on a signal from an accelerator pedal position sensor.

5. The method of claim 1 wherein the step of determining whether the brake pedal is released is based on a signal from a brake pedal position sensor.

6. The method of claim 1 wherein increasing the target speed reduces an amount of time between an acceleration request and acceleration of the hybrid vehicle.

7. The method of claim 1 wherein the primary power source is an internal combustion engine.

8. The method of claim 1 wherein the secondary power source is a battery.

9. A method for controlling a wheel drive system of a hybrid electric vehicle during an engine start initiated while the hybrid electric vehicle is stationary, the hybrid electric vehicle having an engine, a voltage source, a power transfer unit adapted to drive a vehicle wheel and having a plurality of gear ratios, and a electrical machine adapted to drive the engine and/or the power transfer unit, the method comprising:

detecting whether a brake pedal is released;

initiating an engine start sequence if the brake pedal is released, the engine start sequence including powering the electrical machine with the voltage source to drive the engine at a target speed;

determining whether the engine is started;

determining whether a drive gear of the power transfer unit is engaged;

determining whether vehicle acceleration is requested;

selecting a speed adjustment value;

increasing the target speed by an amount equal to the speed adjustment value if vehicle acceleration is requested, a drive gear is engaged, and the engine is not started;

adjusting output of the electrical machine to maintain the target speed; and repeating the determining, selecting, increasing, and adjusting steps until the engine is started.

10. The method of claim 9 wherein the engine is started when the engine is able to maintain the target speed without assistance from the electrical machine.

11. The method of claim 9 wherein the determining, selecting, increasing, and adjusting steps are not repeated if the drive gear is not engaged or if vehicle acceleration is not requested.

12. The method of claim 9 wherein a drive gear is engaged when one of the plurality of gear ratios configured to transmit torque from the electrical machine to the vehicle wheel is selected.

13. The method of claim 9 wherein the speed adjustment value is based on an amount of vehicle acceleration demanded by the driver.

14. The method of claim 9 wherein the step of determining whether vehicle acceleration is requested is based on a signal from an accelerator pedal position sensor and the step of determining whether the brake pedal is released is based on a signal from a brake pedal position sensor.

15. A method for starting an engine of a hybrid electric vehicle, the hybrid electric vehicle having an engine, a voltage source, a power transfer unit adapted to drive a vehicle wheel and having a plurality of gear ratios, a starter-alternator selectively coupled to the engine via a first clutch and adapted to drive the power transfer unit, the method comprising:

determining whether the hybrid electric vehicle is stationary;

determining whether a brake pedal is released;

initiating an engine start sequence if the hybrid electric vehicle is stationary and the brake pedal is released, the engine start sequence including:

powering the starter-alternator with the voltage source to attain a target rotational speed;

engaging the first clutch to provide torque to the engine;

providing fuel and air to the engine; and combusting fuel in the engine;

assessing whether vehicle acceleration is requested by a driver;

increasing the target rotational speed if vehicle acceleration is requested by the driver;

adjusting voltage provided to the starter-alternator to maintain the target rotational speed; and repeating the assessing, increasing, and adjusting steps until the engine is started.

16. The method of claim 15 wherein the engine is started when the engine maintains the target rotational speed without torque from the starter-alternator.

17. The method of claim 15 wherein the step of assessing whether vehicle acceleration is requested by the driver is based on a signal from an accelerator pedal position sensor.

18. The method of claim 15 wherein the step of determining whether the brake pedal is released is based on a signal from a brake pedal position sensor.

19. The method of claim 15 wherein the step of assessing whether vehicle acceleration is requested further comprises determining whether a power transfer unit gear ratio is engaged.

20. The method of claim 19 wherein the target rotational speed is increased by an amount based on a signal from an accelerator pedal position sensor if vehicle acceleration is requested and a power transfer unit gear ratio is engaged.

* * * * *